Oct. 1, 1929.   C. W. McDANIEL   1,730,156
LATHE TOOL HOLDER
Filed March 17, 1928
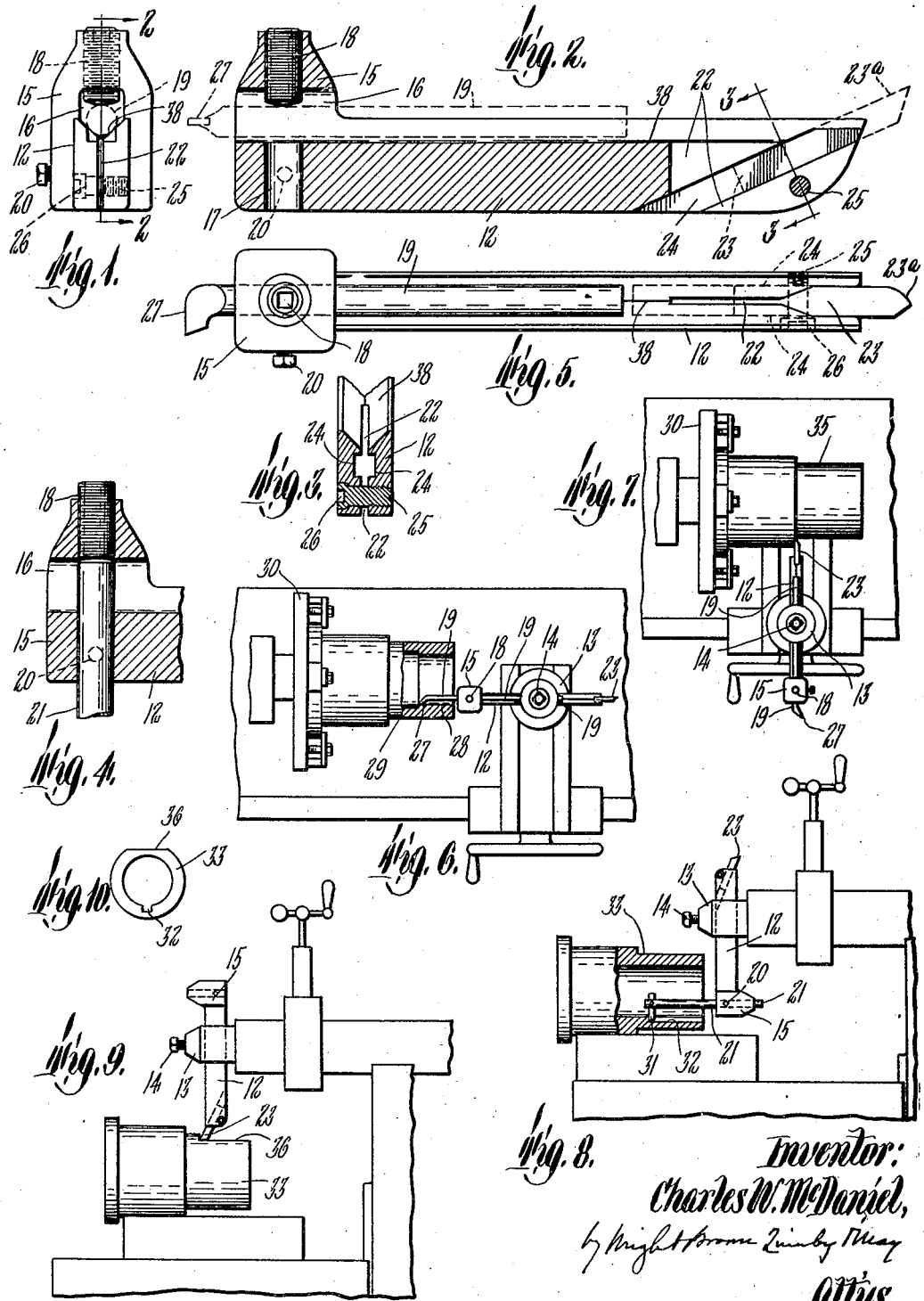
Inventor:
Charles W. McDaniel,
by Wright Brown Quinby May
attys.

Patented Oct. 1, 1929

1,730,156

UNITED STATES PATENT OFFICE

CHARLES W. McDANIEL, OF PORTSMOUTH, NEW HAMPSHIRE

LATHE TOOL HOLDER

Application filed March 17, 1928. Serial No. 262,561.

The object of this invention is to provide a lathe tool-holder of simple construction, adapted to be securely engaged in different positions with the tool post of a machine such as a lathe, a shaper, and a planer, and to securely hold a plurality of tools adapted to operate, each in a manner different from the others, on work engaged with the machine.

Of the accompanying drawings forming a part of this specification,—

Figure 1 is an end view of a tool-holder embodying the invention.

Figure 2 is a section on line 2—2 of Figure 1, showing two tools by dotted lines.

Figure 3 is a section on line 3—3 of Figure 2.

Figure 4 is a view similar to a portion of Figure 2, showing the shank of another tool.

Figure 5 is a top plan view, showing by full lines the tools indicated by dotted lines in Figure 2.

Figures 6, 7, 8 and 9 are fragmentary views, showing portions of different machines, each including a tool post, and illustrating several uses to which the tool holder may be put, Figures 6 and 7 showing the tool-holder in the tool post of a lathe, and Figures 8 and 9 in the tool post of a shaper.

Figure 10 is an end view of a piece of work shaped by tools carried by my improved holder.

The same reference characters indicate the same parts in all of the figures.

In the drawings, 12 designates an arm formed to be engaged with the tool post 13 of either a lathe, a shaper, or a planer, the tool post being slotted as usual, to receive and permit longitudinal adjustment of the arm, and provided with a set screw 14, adapted to secure the arm in any adjusted position. Figures 6 and 7 show portions of a turning lathe, the tool post 12 of which is arranged vertically, and adapted to support the arm 12 horizontally. Figures 8 and 9 show portions of a shaper, the tool post being arranged horizontally, and adapted to support the arm vertically.

Formed on one end of the arm 12 is a head 15, provided with a longitudinal aperture 16, adapted to receive a tool shank 19, extending lengthwise of the arm 12, and a transverse aperture 17, adapted to receive a tool shank 21, extending crosswise of the arm.

A set screw 18 engaged with a tapped orifice in the head, is adapted to enter the aperture 16 and secure a tool shank 19 therein. A set screw 20, also engaged with a tapped orifice in the head, is adapted to enter the aperture 17, and secure a tool shank 21 therein.

The end of the arm 12 opposite the head 15, is prepared to receive and clamp the body portion of the tool 23, by first cutting in the arm an elongated inclined orifice, extending from one side to the opposite side of the arm, one end of the orifice extending through the under side of the arm, and the opposite end extending through the upper side and the end of the arm, as shown by Figure 2, the orifice being preferably square in cross section, and formed to closely fit the cross section of the body portion of the tool 23.

A saw kerf 22 bisecting the end portion of the arm in which the inclined orifice is formed, is then cut, so that said end portion is divided into two opposed clamping-jaws, having in their inner sides coinciding grooves 24, the surfaces of which are portions of the surfaces of the inclined orifice. Coinciding orifices are formed in the jaws, one of the orifices being tapped, and a clamping screw is engaged with the tapped orifice, said screw having a head engaging a shoulder in the orifice of the other jaw. Rotation of the screw causes the jaws to either clamp or release the tool 23.

The shank 19 may be the shank of a boring tool 27, adapted, as shown by Figure 6, to form a bore 28 in a piece of work 29, rotated by a lathe chuck 30. The shank 21 may be the shank of a shaper tool 31, adapted, as shown by Figure 8, to form a keyway 32 (Figure 10) in a tubular piece of work 33, the tool post and the tool holder being reciprocated, and the work held stationary.

As indicated by Figure 8, the set screw 18, may be removed, to permit the shank 21 to extend through the tapped orifice in the head with which said set screw is usually engaged.

The turning tool 23 may be adapted, as shown by Figure 7, to turn an external surface on a cylindrical piece of work 35, rotated by the lathe chuck 30. Said tool may be adapted, also, as shown by Figure 9, to be used in a shaper and act on the piece of work 33, by forming thereon a flat face 36, the work being held stationary, and the tool 23 reciprocated.

In some cases each of the tools may remain attached to the holder, while either of the other tools is performing its function, so that no time need be spent in removing and inserting a tool. In many cases each of the tools 23 and 27, may remain attached to the holder. In practically all cases the tool 23 may remain attached to the holder. The longitudinal adjustability of the arm 12 in the tool post 13, permits the head 15 to be located close to the tool post, when either of the tools 27 and 31 is in use, and permits the clamping jaws to be located close to the tool post, when the tool 23 is in use.

The holder is preferably provided with a longitudinal groove 38, extending lengthwise of the arm 12, and extended through the head 15, so that one end portion of the groove forms one side of the aperture 16. The groove constitutes an elongated recessed seat against which one side of the tool shank 19 is clamped by the set screw 18.

The tool shank 19 may be elongated so that it extends into or through the arm-receiving opening in the tool post 13, and may be clamped therein by the tool-post set-screw 14, so that the shank is clamped at one point by the set-screw 18, and at another by the set-screw 14. Said elongation is shown by Figures 6 and 7.

I claim:

1. A multiple holder comprising a body adapted to be adjustably engaged with a lathe tool-post and hold either of a plurality of tools in different predetermined operative positions relative to said post, said body comprising an oblong head at one end of the body and an oblong shank projecting from one side of the head, the longitudinal axes of the head and shank being substantially at right angles with each other, the body being provided with an open V-shaped groove extending from end to end of the body, along the top of the shank and through the head, and with alined orifices in the head arranged substantially at right angles with the groove and opening into the grooved portion of the head, the face of the groove forming a seat for a tool shank extending lengthwise of the body, and the orifices being adapted to receive a tool shank extending cross-wise of the body, one of the orifices having an internal thread, a set screw engaged with the threads of said orifice and adapted to clamp a longitudinally extending tool shank against the groove faces, said screw being displaceable to permit the insertion of a transversely extending tool shank in the alined orifices when the longitudinally extending shank is removed, and means for rigidly securing a transversely extending shank in said orifices.

2. A multiple holder as specified by claim 1, the end of the shank opposite the head being divided to provide clamping jaws, the inner faces of said jaws having inclined coinciding grooves, and means for actuating said jaws to clamp a tool in said grooves.

In testimony whereof I have affixed my signature.

CHARLES W. McDANIEL.